United States Patent Office 3,183,926
Patented May 18, 1965

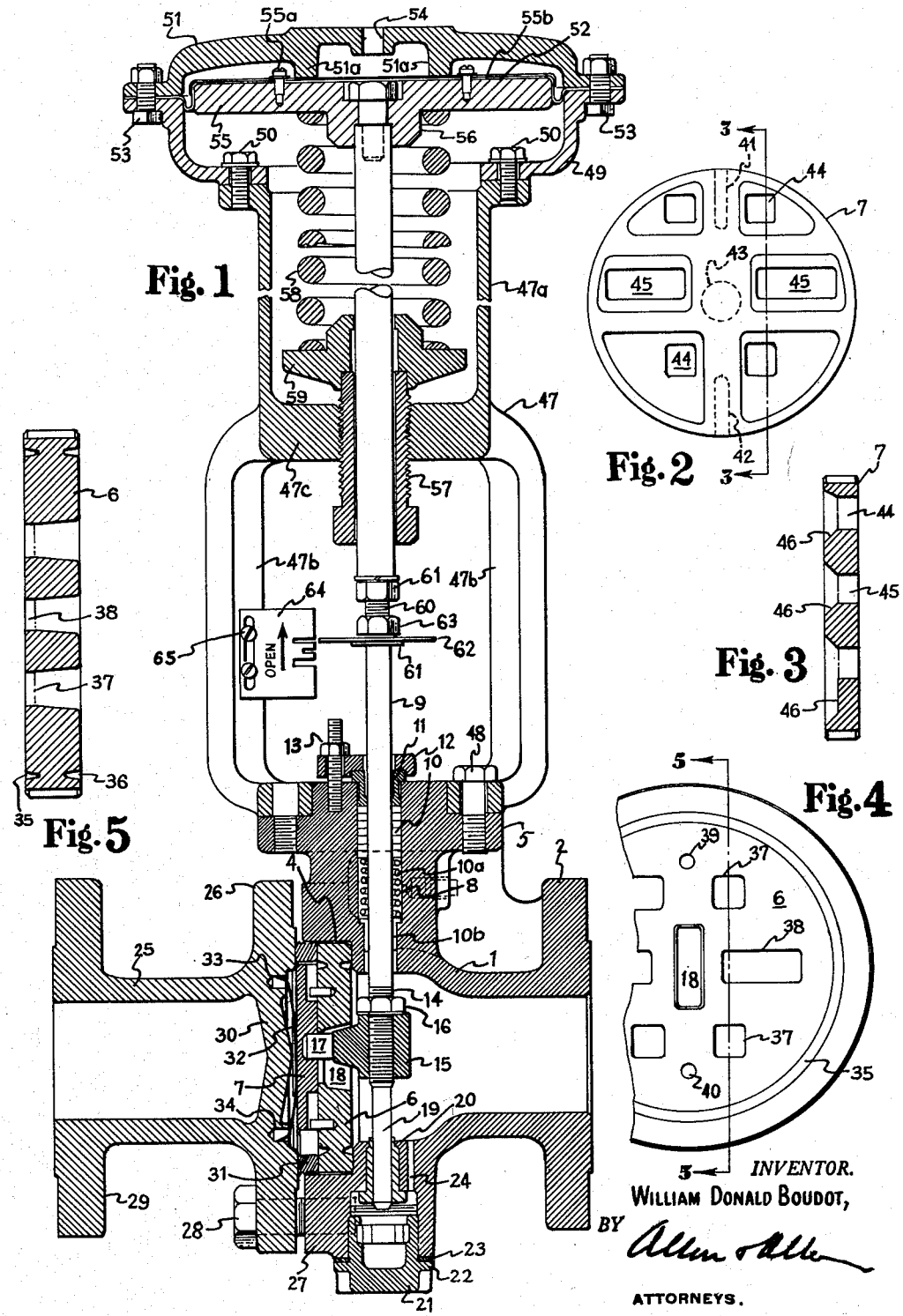

3,183,926
CONVERTIBLE GATE VALVE WITH REMOVABLE HOUSING SECTION
William Donald Boudot, Cincinnati, Ohio, assignor, by mesne assignments, to Richards Industries, Inc., Cincinnati, Ohio, a corporation of Ohio
Filed May 19, 1961, Ser. No. 111,206
11 Claims. (Cl. 137—270)

This invention relates to that field of apparatus in which a valve in a line for the flow of a fluid is caused to open and close in response to some external condition which can be measured. Such apparatus finds utility in many applications in manufacturing procedures, in science, and the like. A simple illustration of utility, which is not limiting upon the invention, lies in the field of heating or cooling, where the flow of a heating or cooling fluid through a conduit is controlled in accordance with a measure of temperature.

It has hitherto been known to provide a valve for the fluid conduit of a type in which a stationary plate is located across the path of a flow of fluid through the valve, and another plate, located on the upstream side of the flow of the fluid through the valve, slides against the first mentioned plate. Apertures in both plates may be brought into or out of alignment during the sliding of the second mentioned plate. The coacting plate surfaces are, of course, accurately lapped; the second mentioned plate is moved by a valve rod; and the construction is such that the force required to open or close the valve is substantially independent of the pressure of the fluid at the valve. The valve rod may be operated in various ways, but it is common practice to provide a chamber in connection with the valve in which a diaphragm, acted upon by pressure generated by the temperature measuring means, is employed to move the valve rod.

The present invention is directed to the provision of improvements in apparatus of this character. It is an object of the invention to provide a valve the entire interior mechanism of which is accessible upon the removal of a single flanged section, as distinguished from earlier structures in which the entire valve had to be removed from the pipeline before its interior mechanism could be made available for servicing or adjustment.

It is an object of the invention to provide a valve structure which is easily and simply reversible in operation.

It is an object of the invention to provide a valve structure affording an indication of valve stem position and travel so that adjustment therein can readily be made. In this connection, it is an object to provide a travel indicator scale which will permit readjustment of the valve stroke without demounting the valve.

It is an object of the invention to provide a bridge means for directing the fluid flow in the valve toward the orifice openings of the plates so as to avoid undue turbulence.

It is also an object of the invention to provide an improved spring means for holding the sliding valve plate against the fixed valve plate in structures of this type.

These and other objects of the invention which will be set forth hereinafter or will be apparent to one skilled in the art upon reading these specifications, are accomplished by that certain construction and arrangement of parts of which an exemplary embodiment will now be described. Reference is made to the accompanying drawings wherein:

FIG. 1 is a vertical cross-section taken through the valve and the top works as hereinafter described.

FIG. 2 is a plan view of the sliding plate member of the valve.

FIG. 3 is a sectional view of the same plate taken along the section line 3—3 of FIG. 2.

FIG. 4 is a partial plan view of the stationary plate of the valve of this invention.

FIG. 5 is a sectional view of the same plate taken along the section line 5—5 of FIG. 4.

Referring to the accompanying drawings, the valve comprises a main housing member 1 provided with a flange 2 for connection with a similar flange in a conduit (not shown) on the downstream side of the valve. The main housing 1 is a hollow member, as shown. At its upstream end it is provided with a seat 4 for engaging the periphery of a stationary valve plate hereinafter described in greater detail.

The main housing or body member also carries an upper flange 5 to which the topworks hereinafter described may be bolted. There is a passageway 8 extending downwardly into the hollow interior of the main housing member 1 for the passage of a valve stem or rod 9. There will be packing material 10 located in an upper portion of the upper extension of the body. This packing material may be held in place by a gland member 11, which in turn is retained by a keeper 12 held to the upper part of the main valve housing by one or a plurality of bolt structures 13. The packing 10 may, if desired, be compressed by a spring 10a in the passageway 8, engaged between the lower surface of the packing and an abutment member and guide 10b resting against a shoulder in the passageway. The purpose of this arrangement is to prevent leakage of fluid from the hollow interior of the main valve housing 1 through the passageway 8 while permitting a longitudinal or axial movement of the valve stem or rod 9.

Within the hollow interior of the main housing 1, the valve stem 9 is threaded as at 14, and a means 15 for operating the sliding plate is turned thereon to an adjusted position and is held against further relative movement by a lock nut and lock washer 16. It will be noted that the member 15 has a lateral extension terminating in a nose 17 passing through an elongated vertical opening 18 in the stationary plate 6, and engaging the slidable plate 7 as hereinafter described.

A lower and preferably reduced portion 19 of the valve stem is slidably mounted in a bearing 20 at the lower side of the main housing member 1. Here again provision is made against the leakage of fluid from the hollow interior of the valve. This provision may take any suitable form. A hollow plug 21 has been shown threaded into an opening in the lower part of the main housing 1 and provided with a peripheral flange 22. A sealing gasket 23 is compressed between this flange and a mating surface on the body of the main housing member. In order to prevent pressure beyond the end of the valve stem from interfering with its axial movements, a pressure equalizing passageway 24 may be formed between the hollow interior of the housing member 1 and the hollow interior of the plug 21.

The valve housing is completed by a hollow member 25 on the upstream end of the main housing member 1. The member 25 is provided with a flange 26 which may be held to a flange-shaped portion of the main housing member by bolts one of which is shown at 28. A flange 29 is also formed on the other end of the hollow member 25, by means of which it may be connected to a pipe or conduit at the upstream end of the system.

There is a relatively thin bridge-shaped member 30 which extends across the hollow interior of the member 25. This bridge member is preferably given an airfoil shape in cross-section, and it serves in part to direct the flow of the fluid passing through the valve to the openings in the plates hereinafter described.

It will be noted that the member 25 lies wholly on the upstream side of the slidable plate 7. There is an annular sealing member 31 located between a suitably machined surface on the flange 26 and the external peripheral edge portion of the stationary plate 6. The member 25 may have its flanges unbolted from the main valve housing and from the corresponding flange on the upstream end of the conduit (not shown), whereupon the member 25 may be removed without disturbing any other part of the valve or conduit system.

However, a leaf spring element 32 is mounted in the member 25 and is removable with it, the spring having for its purpose the holding of the movable plate 7 against the stationary plate 6. The spring 32 is of generally U-shaped configuration, the elongated base of the U being arcuate, and the legs of the U engaging resiliently in bored recesses 33 and 34 in the flange 26 of the member 25. The spring 32 parallels the bridge 30; and it will be noted that the mid-portion of the bridge extends into close proximity to the central portion of the spring 32 so as to minimize or prevent any reverse curvature of the spring.

The stationary plate member 6 is best shown in FIGS. 4 and 5. It is provided with annular grooves 35 and 36 near its outer edge as is customary in this art. It has a central opening 18, elongated vertically, to permit passage of the operating means for the sliding plate; and it has symmetrically arranged openings 37 and 38 of equal width vertically, and spaced from each other in the vertical direction by a distance somewhat greater than the vertical widths of the openings. The stationary plate 6 also carries two pins 39 and 40, aligned with the axis of the plate in a vertical direction and projecting in the direction of the movable plate. These pins serve as guides for the movable plate which, as shown in FIG. 2, is provided with grooves 41 and 42 on its downstream side. The engagement of the pins on the stationary plate in the grooves in the sliding plate maintains the alignment of the plates. The sliding plate, as shown at 43 in FIG. 2, is provided with a recess for the reception of the nose 17 of the operating means on the valve stem.

The movable plate is provided with openings 44 and 45 of similar sizes and shapes to the openings 37 and 38 in the stationary plate, but asymmetrically arranged with respect to the horizontal axis of the plate. Needless to say, the meeting surfaces of the plates will be carefully and accurately ground and lapped so as to provide fluid tightness. The arrangement of the holes in the plates is such that at one position of the sliding plate the holes in it will lie opposite spaces between holes in the stationary plate so that the flow of fluid through the valve will be cut off. At another position or positions the holes will coincide to a greater or lesser degree, or fully, thus permitting the flow of fluid. As shown in FIG. 3, the edges of the holes are preferably chamfered on the upstream side of the plate 7 as shown at 46 so as to decrease turbulence of flow.

It will be noted in FIGS 2 and 4 that the several holes 37, 38, 44 and 45 in the stationary and slidable plates are arranged symmetrically about a vertical center line in each plate. This makes it possible to reverse the operation of the valve by turning the slidable plate 7 through an angle of 180°. In other words, depending upon the orientation of the slidable plate 7, an equal movement of the valve stem in the same direction can be made either to open the valve or to close it.

FIG. 1 shows a generally columnar member 47, the upper part of which, 47a, is a hollow cylindrical spring housing for a purpose hereinafter set forth, and the lower part of which is formed of spaced ribs 47b permitting a view of the valve stem 9. The lower part of the columnar member 47 is detachably secured to the upper part of the main valve housing 1 as at 48. The upper part of the member 47a is secured to the lower part of a diaphragm housing 49 as by bolts 50, or in any other suitable way. The diaphragm housing is completed by a top member 51 and is provided with a diaphragm of suitably strong and flexible material as shown at 52. The periphery of the diaphragm is usually clamped between the members 49 and 51, which may be held together by bolts 53, or in any other suitable way. The upper member 51 of the diaphragm housing has a nipple 54 by which a connection may be made to a pressure line. The diaphragm may be of rubbery substance, or of metal annularly corrugated to provide for flexibility, as will be well understood by the worker in the art.

It will be apparent that connection may be made through the nipple 54 to any suitable means for sensing or measuring an external condition. One such means, but without limitation, would be a temperature measuring device including a tube and a hollow head filled with fluid. The head may be placed at a point desired for the measurement of temperature and the expansion and contraction of the fluid in the device will be reflected in changes of pressure within the diaphragm housing 49, 51, above the diaphragm 52. Such changes in pressure are used to move the valve stem of the device of this invention.

Beneath the diaphragm 52 there will be a diaphragm-follower 55, to which the diaphragm may be attached as by screws 55a and a plate 55b or otherwise. The upper diaphragm housing 51 may have internal abutments 51a to limit the rise of the diaphragm. In the particular embodiment, the diaphragm-follower is attached to the upper end of an extension 9a of the valve stem 9, as by a bolt 56, or in any other suitable way. Thus the valve stem will be moved in the vertical or axial direction in accordance with movements of the diaphragm 52.

The axial movements of the valve stem extension 9a are guided in a threaded member 57 engaged in a threaded bore in an intermediate portion 47c of the columnar member 47. A diaphragm spring 58 is engaged between the diaphragm-follower 55 and a lower abutment means 59 rotatably resting on the top of the member 57. It will be seen that the force of the spring 58 may be adjusted by turning the threaded member 57, the member having a head 57a capable of being engaged by a tool for that purpose.

There has been described above an exemplary form of topworks which should not be regarded as a limitation on the invention excepting where set forth in the appended claims. It will be understood that other forms of topworks may be employed, including forms in which the valve stem 9 is moved axially by means other than a diaphragm.

The upper end of the valve stem 9 is threaded as at 60, the threaded portion terminating in an abutment shoulder on which a washer 61 rests. This serves to support a disc member 62 which may be held in place by a nut 63 and a conventional lock washer. The disc member 62 serves as a pointer or indicator and coacts with a scale member 64 adjustably affixed to one of the ribs 47b as by screws 65. Since the disc member and the scale member are visible between the ribs of the columnar member, the operator of the apparatus is given a visual indication of the position of the valve stem and hence of the relative positions of the stationary valve plate 6 and the slidable valve plate 7 without opening up the valve body. As has been explained above, when the action of the valve is to be reversed, the slidable plate 7 will be turned through an angle of 180°. When this is done, the scale member 64 may be removed and replaced in an upside down position and will then continue to give, in cooperation with the pointer disc 62 a correct indication of the relative position of the valve parts and hence of the flow of fluid through the valve.

It will be further understood that the entire topworks may be removed from its connection with the valve without disassembling the valve itself or the conduit line in which the valve operates.

Modifications may be made in the invention without departing from the spirit of it. The invention having been described in an exemplary embodiment, what is claimed as new and desired to be secured by Letters Patent is:

1. In a sliding plate regulator valve, a valve body, said valve body comprising first and second hollow body members, said first hollow body member having at one end means for attachment to a conduit, a valve stem, said first body member having means for slidably mounting said valve stem in a transverse position, means associated with said first body member for actuating said valve stem, a fixed apertured plate mounted in a seat near the other end of said first body member, a sliding apertured plate lying outwardly against said fixed apertured plate, said apertures cooperating to control fluid flow through the flow passage defined by the hollow bodies, said plates being symmetrically mounted with respect to each other and a connection between said valve stem and said sliding apertured plate through the fixed apertured plate, said sliding plate having its face opposite said fixed plate recessed to reduce the net area acted upon by fluid pressure, said second body member having at one end means for attachment with a conduit and at the other end means for attachment with said first body member, both of said attachment means providing planes of parting which are perpendicular to the flow axis, the plane of parting between said first and second body members lying beyond the said sliding apertured plate on the side away from said valve stem, whereby said second hollow body member after disconnection from its conduit and from said first hollow body member may be removed without disturbance of said plates and without disconnection of said first hollow body member from its conduit, providing access to said plates and the interior of said first body member.

2. The structure claimed in claim 1 wherein the apertures in said fixed and sliding plates are asymmetrically arranged so that upon rotating the sliding plate through an angle of 180° with respect to the fixed plate, a movement of said valve stem which previously served to bring the apertures of said plates into coincidence will now serve to bring them into a noncoinciding position.

3. The structure claimed in claim 2 wherein said means associated with said first body member for actuating said valve stem comprises a portion having spaced columns between which said valve stem is visible, an indicator on said valve stem and a scale mounted on one of said columns to indicate the relative position of said plates in the first body member.

4. The structure claimed in claim 2 wherein said means associated with said first body member for actuating said valve stem comprises a portion having spaced columns between which said valve stem is visible, an indicator on said valve stem and a scale mounted on one of said columns to indicate the relative position of said plates in the first body member, said scale being reversible when said sliding plate is rotated through 180°.

5. The structure claimed in claim 2 wherein said means associated with said first body member for actuating said valve stem comprises a portion having spaced columns between which said valve stem is visible, an indicator on said valve stem and a scale mounted on one of said columns to indicate the relative position of said plates in the first body member, said scale being reversible when said sliding plate is rotated through 180°, a diaphragm housing, a diaphragm and diaphragm-follower mounted therein, a stem connected to said diaphragm-follower, and a connection between said last mentioned stem and said valve stem.

6. In a sliding plate regulator valve, a valve body, said valve body comprising first and second hollow body members, said first hollow body member having at one end means for attachment to a conduit, a valve stem, said first body member having means for slidably mounting said valve stem in a transverse position, means associated with said first body member for actuating said valve stem, a fixed apertured plate mounted in a seat near the other end of said first body member, a sliding apertured plate lying outwardly against said fixed apertured plate and a connection between said valve stem and said sliding apertured plate through the fixed apertured plate, said apertures cooperating to control fluid flow through the flow passage defined by the hollow bodies, spring means associated with said second body member for holding said sliding apertured plate against said fixed apertured plate, said spring means comprising a leaf spring element of substantially U-shape having an arcuate base engaging said sliding plate, said second body member having at one end means for attachment with a conduit and at the other end means for attachment with said first body member, both of said attachment means providing planes of parting which are perpendicular to the flow axis, the plane of parting between said first and second body members lying beyond the said sliding apertured plate on the side away from said valve stem, whereby said second hollow body member after disconnection from its conduit and from said first hollow body member may be removed without disturbance of said plates and without disconnection of said first hollow body member from its conduit, providing access to said plates in the interior of said first body member.

7. The combination of claim 6 wherein said spring has its end portions engaged in holes in said second body member for retention of said spring with said body.

8. In a sliding plate regulator valve, a valve body, said valve body comprising first and second hollow body members, said first hollow body member having at one end means for attachment to a conduit, a valve stem, said first body member having means for slidably mounting said valve stem in a transverse position, means associated with said first body member for actuating said valve stem, a fixed apertured plate mounted in a seat near the other end of said first body member, a sliding apertured plate lying outwardly against said fixed apertured plate and a connection between said valve stem and said sliding apertured plate through the fixed apertured plate, said apertures cooperating to control fluid flow through the flow passage defined by the hollow bodies, bridge means extending across the hollow interior of said second body member adjacent said sliding plate, said bridge means having a configuration to direct the flow of fluid to the apertures of said plates, said second body member having at one end means for attachment with a conduit and at the other end means for attachment with said first body member, both of said attachment means providing planes of parting which are perpendicular to the flow axis, the plane of parting between said first and second body members lying beyond the said sliding apertured plate on the side away from said valve stem, whereby said second hollow body member after disconnection from its conduit and from said first hollow body member may be removed without disturbance of said plates and without disconnection of said first hollow body member from its conduit, providing access to said plates and the interior of said first body member.

9. In a sliding plate regulator valve, a valve body, said valve body comprising first and second hollow body members, said first hollow body member having at one end means for attachment to a conduit, a valve stem, said first body member having means for slidably mounting said valve stem in a transverse position, means associated with said first body member for actuating said valve stem, a fixed apertured plate mounted in a seat near the other end of said first body member, a sliding apertured plate lying outwardly against said fixed apertured plate and a connection between said valve stem and said sliding apertured plate through the fixed apertured plate, said apertures cooperating to control fluid flow through the flow passage defined by the hollow bodies, said second hollow body having spring means, removable therewith, for holding said sliding apertured plate against said fixed apertured plate, said spring means being a leaf spring element of substantially U-shaped having an arcuate base for engaging the sliding plate, and angularly related end portions engaged in holes in said second body member to retain the spring means therein, said second body member having a bridge extending across its hollow interior and so shaped and positioned as to limit the deflection of said spring means and to direct the flow of fluid to the apertures in said plates, said second body member having at one end means for attachment with a conduit and at the other end means for attachment with said first body member, both of said attachment means providing planes of parting which are perpendicular to the flow axis, the plane of parting between said first and second body members lying beyond the said sliding apertured plate on the side away from said valve stem, whereby said second hollow body member after disconnection from its conduit and from said first hollow body member may be removed without disturbance of said plates and without disconnection of said first hollow body member from its conduit, providing access to said plates and the interior of said first body member.

10. In a sliding plate regulator valve, a valve body, said valve body comprising first and second hollow body members, said first hollow body member having at one end means for attachment to a conduit, a valve stem, said first body member having means for slidably mounting said valve stem in a transverse position, means associated with said first body member for actuating said valve stem, a fixed apertured plate mounted in a seat near the other end of said first body member, a sliding apertured plate lying outwardly against said fixed apertured plate and a connection between said valve stem and said sliding apertured plate through the fixed apertured plate, said apertures cooperating to control fluid flow through the flow passage defined by the hollow bodies, guide means provided between said fixed and sliding plates for maintaining the alignment of said plates, said second body member having at one end means for attachment with a conduit and at the other end means for attachment with said first body member, both of said attachment means providing planes of parting which are perpendicular to the flow axis, the plane of parting between said first and second body members lying beyond the said sliding apertured plate on the side away from said valve stem, whereby said second hollow body member after disconnection from its conduit and from said first hollow body member may be removed without disturbance of said plates and without disconnection of said first hollow body member from its conduit, providing access to said plates and the interior of said first body member.

11. The combination of claim 10 wherein said guide means comprises a pin and vertical slot arrangement between said plates.

References Cited by the Examiner
UNITED STATES PATENTS

| | | | |
|---|---|---|---|
| 365,076 | 6/87 | Jordan | 251—193 XR |
| 2,827,260 | 3/58 | Jordan | 251—326 |
| 2,895,496 | 7/59 | Sanctuary | 251—367 XR |
| 3,089,505 | 5/63 | Forster | 137—270 |

ISADOR WEIL, *Primary Examiner.*